(12) United States Patent
Yu et al.

(10) Patent No.: US 12,152,681 B2
(45) Date of Patent: Nov. 26, 2024

(54) WATER PATH CHANGE-OVER VALVE AND BATHROOM DEVICE

(71) Applicant: SINYU TECHNOLOGY (FUJIAN) CO., LTD., Fujian (CN)

(72) Inventors: Zhangjun Yu, Fujian (CN); Zhicheng Lin, Fujian (CN)

(73) Assignee: SINYU TECHNOLOGY (FUJIAN) CO., LTD., Fujian (CN)

( * ) Notice: Subject to any disclaimer, the term of this patent is extended or adjusted under 35 U.S.C. 154(b) by 8 days.

(21) Appl. No.: 18/134,013

(22) Filed: Apr. 12, 2023

(65) Prior Publication Data

US 2024/0255061 A1 Aug. 1, 2024

(30) Foreign Application Priority Data

Jan. 30, 2023 (CN) .......................... 202310074546.0

(51) Int. Cl.
*F16K 11/074* (2006.01)
*F16K 5/04* (2006.01)
*F16K 11/085* (2006.01)
*F16K 31/60* (2006.01)

(52) U.S. Cl.
CPC ........ *F16K 11/0743* (2013.01); *F16K 5/0407* (2013.01); *F16K 11/074* (2013.01); *F16K 11/0853* (2013.01); *F16K 31/602* (2013.01); *F16K 5/0464* (2013.01)

(58) Field of Classification Search
CPC . F16K 11/0743; F16K 11/074; F16K 37/0008
See application file for complete search history.

(56) References Cited

U.S. PATENT DOCUMENTS

| 3,863,675 | A | * | 2/1975 | Wiltshire | F16K 11/074 137/625.46 |
| 4,326,671 | A | * | 4/1982 | Goguen | A01G 25/162 239/66 |
| 5,316,042 | A | * | 5/1994 | Lim | F16K 3/08 137/625.11 |
| 7,299,510 | B2 | * | 11/2007 | Tsai | E03C 1/023 4/615 |
| 2008/0295908 | A1 | * | 12/2008 | Neels | F16K 11/074 137/625.46 |

FOREIGN PATENT DOCUMENTS

CN 104100735 A * 10/2014 ............ F16K 11/074

* cited by examiner

*Primary Examiner* — Atif H Chaudry
(74) *Attorney, Agent, or Firm* — BKRIP LLC (57) ABSTRACT

Provided are water path change-over valve and bathroom device. The water path change-over valve includes a valve seat assembly and a water path change-over assembly. The water path change-over assembly is located in the water path change-over cavity of the valve seat assembly, the water path change-over assembly includes a valve rod and a rotating member, the valve rod is connected with the rotating member and two ends of the valve rod respectively rotatably penetrate through the valve seat assembly, and the rotating member is provided thereon with a water through hole. The valve rod drives the rotating member to rotate, so that the water through hole can be corresponding to a position of at least one water outlet hole in the water path change-over cavity, so that the water inlet hole is in communication with at least one water outlet hole through the water through hole.

16 Claims, 9 Drawing Sheets

WATER PATH CHANGE-OVER VALVE AND BATHROOM DEVICE

CROSS-REFERENCE TO RELATED APPLICATION

The present disclosure claims the priority to Chinese patent application with the filing number 2023100745460 filed on Jan. 30, 2023 with the Chinese Patent Office and entitled "Water Path Change-Over Valve and Bathroom Device", the contents of which are incorporated herein by reference in entirety.

TECHNICAL FIELD

The present disclosure relates to the technical field of sanitary wares, in particular, to a water path change-over valve and a bathroom device.

BACKGROUND ART

At present, the existing multifunctional shower products are simultaneously provided with parts such as a handheld shower head, a top shower, a spray gun, and a faucet, so as to realize multiple water outlet functions. A multifunctional shower product is generally provided with a water path change-over switch between a water inlet path and multiple-function water paths, so as to control the water inlet path to be respectively in change-over communication with water paths of different functions through the water path change-over switch, thus switching different water outlet functions.

The existing water path change-over switch is generally connected with a water distribution disc in a water path change-over cavity through a handle, so as to control rotation of the water distribution disc to switch water paths of different functions, wherein the water distribution disc is usually sleeved on a rotating post in the water path change-over cavity, and under the pressure of the water distribution disc and water flow, a connecting part between the rotating post and an inner wall surface of the water path change-over cavity is prone to fracture due to stress concentration, resulting in that the water path change-over switch is damaged and cannot be repaired by replacing parts.

SUMMARY

The present disclosure provides a water path change-over valve and a bathroom device, so as to solve the problems in the prior art that the rotating post, which is used to fix the water distribution disc in the water path change-over switch, is easily broken due to stress concentration under the pressure of the water distribution disc and the water flow for a long time, causing that the water path change-over switch is damaged and cannot be repaired by replacing parts.

In order to solve the above problem, the present disclosure provides a water path change-over valve, including:

a valve seat assembly, having a water path change-over cavity, a water inlet channel, and a plurality of water outlet channels, wherein the inlet channel and the plurality of water outlet channels are respectively in communication with the water path change-over cavity, and an inner wall of the water path change-over cavity is respectively provided with a water inlet hole in communication with the water inlet channel and water outlet holes in communication with the water outlet channels; and a water path change-over assembly, located in the water path change-over cavity, and including a valve rod and a rotating member, wherein the valve rod is connected with the rotating member and two ends of the valve rod respectively rotatably penetrate through the valve seat assembly, and the rotating member is provided thereon with a water through hole, wherein the valve rod drives the rotating member to rotate, so that the water through hole can be corresponding to a position of at least one of the water outlet holes, so as to realize that the water inlet hole is in communication with at least one of the water outlet holes through the water through hole.

In a possible embodiment, the rotating member includes a first disc portion, a connecting portion, and a second disc portion which are sequentially connected along an axial direction of a central axis of rotation of the rotating member, the valve rod penetrates through the first disc portion, the connecting portion, and the second disc portion in sequence, the first disc portion is provided with the water through hole, two opposite surfaces of the first disc portion and the second disc portion are respectively abutted against two opposite inner wall surfaces of the water path change-over cavity, a water inlet gap between the first disc portion and the second disc portion is corresponding to the position of the water inlet hole, so that a liquid entering the water path change-over cavity from the water inlet hole can flow into the water through hole from the water inlet gap.

In a possible embodiment, a plurality of annular sealing members are further provided in the water path change-over cavity, an annular groove is formed at an edge of each water outlet hole, and each of the annular sealing members abuts between the first disc portion and an inner wall surface of corresponding annular groove, respectively.

In a possible embodiment, adjacent annular sealing members are connected with each other and integrally molded, and adjacent annular grooves are in communication with each other.

In a possible embodiment, a mounting groove is provided on a surface in the water path change-over cavity close to the second disc portion, and the second disc portion abuts against inside of the mounting groove.

In a possible embodiment, an elastic ring is provided between the second disc portion and the mounting groove.

In a possible embodiment, a penetrating hole penetrates through the rotating member along the axial direction of the central axis of rotation thereof, the valve rod penetrates through the penetrating hole, an inner wall surface of the penetrating hole is provided with a first positioning portion, and the valve rod is circumferentially provided with a second positioning portion corresponding to position of the first positioning portion, and the first positioning portion abuts against the second positioning portion, so that the valve rod can drive the rotating member to rotate.

In a possible embodiment, the water path change-over assembly further includes a handle, the handle is connected to a first end of the valve rod, and the handle is provided thereon with a guiding portion;

the valve seat assembly is provided thereon with a plurality of connectors at intervals along a rotating direction of the rotating member, and each of the connectors is provided therein with one of the water outlet channels;

when the handle drives the rotating member to rotate through the valve rod so that the guiding portion is corresponding to a position of a certain one of the connectors, the water through hole is in communication with the water inlet channel in the connector; and when the guiding portion is corresponding to a position between two adjacent connectors, the water through hole is in communication with the water outlet channels in the two connectors, respectively.

In a possible embodiment, an elastic post is provided on a side of the handle facing the valve seat assembly, an abutment end of the elastic post elastically abuts against the valve seat assembly, and the handle drives the elastic post to rotate, so that the abutment end slides with respect to the valve seat assembly.

In a possible embodiment, the valve seat assembly is provided with a plurality of positioning grooves at intervals on a side close to the handle along the rotating direction of the rotating member, wherein when the abutment end is sequentially clamped into the positioning grooves at different positions, the guiding portion is corresponding to a position of a certain one of the connectors or is corresponding to a position between two adjacent connectors, respectively.

In a possible embodiment, the second end of the valve rod is provided with a first limiting portion along a rotating direction thereof, the valve seat assembly is provided thereon with a second limiting portion corresponding to a position of the first limiting portion, and two opposite surfaces of the first limiting portion along a rotating direction thereof can respectively abut against the second limiting portion, so as to limit a maximum range of rotation angle of the valve rod; and/or the handle is provided thereon with a third limiting portion, the valve seat assembly is provided thereon with a fourth limiting portion corresponding to a position of the third limiting portion, and two opposite surfaces of the third limiting portion along a rotating direction thereof can respectively abut against the fourth limiting portion, so as to limit a maximum range of rotation angle of the handle.

In a possible embodiment, the water path change-over valve further includes a holder, and the holder is rotatably connected to a side of the valve seat assembly away from the handle.

In a possible embodiment, the water path change-over valve further includes a fixed cover and a rotary member, the valve seat assembly and the fixed cover enclose to form an accommodating cavity, the rotary member is located in the accommodating cavity, and one end of the rotary member rotatably penetrates through the fixed cover and is connected to the holder, so that the fixed cover abuts between the rotary member and the holder.

In a possible embodiment, the holder is provided thereon with a fifth limiting portion, the fixed cover is provided thereon with a sixth limiting portion corresponding to a position of the fifth limiting portion, and two opposite surfaces of the fifth limiting portion along a rotating direction thereof can respectively abut against the sixth limiting portion, so as to limit a maximum range of rotation angle of the holder.

The present disclosure further provides a bathroom device, including the water path change-over valve according to any one of the above embodiments.

The present disclosure has the following beneficial effects: the present disclosure provides a water path change-over valve and a bathroom device. When the water path change-over valve is in use, the user can control the valve rod to rotate, so that the rotating member in the water path change-over cavity is driven by the valve rod to rotate, further the water through hole of the rotating member is in communication with the water outlet holes at different positions, respectively, and finally the water inlet channel is in change-over communication with different water outlet channels, respectively, through the water through hole. As the valve rod is connected with the rotating member and two ends of the valve rod respectively rotatably penetrate through the valve seat assembly, the rotating member can be rotatably connected with the valve seat assembly through the connection with the valve rod. The configuration mode that the two ends of the valve rod are respectively rotatably connected with the valve seat assembly can improve the situation of fracture of the valve rod due to stress concentration under the pressure action of the rotating member and water flow, and when the valve rod is damaged, the water path change-over valve can be maintained by replacing the valve rod.

BRIEF DESCRIPTION OF DRAWINGS

In order to more clearly illustrate technical solutions of embodiments of the present disclosure, drawings which need to be used in the embodiments will be introduced briefly below, and it should be understood that the drawings below merely show some embodiments of the present disclosure, therefore, they should not be considered as limitation on the scope, and those ordinarily skilled in the art still could obtain other relevant drawings according to these drawings, without using any creative efforts.

REFERENCE SIGNS OF MAIN ELEMENTS

100—valve seat assembly; 110—water path change—over cavity; 111—annular groove; 112—mounting groove; 113—elastic ring; 120—water inlet channel; 121—water inlet hole; 130—water outlet channel; 131—water outlet hole; 140—connector; 150—positioning groove; 160—second limiting portion; 170—fourth limiting portion; 200—water path change—over assembly; 210—valve rod; 211— second positioning portion; 212—first end; 213—second end; 214—first limiting portion; 220—rotating member; 221—water through hole; 222—first disc portion; 223—connecting portion; 224—second disc portion; 225—water inlet gap; 226—penetrating hole; 227—first positioning portion; 230—annular sealing member; 240—handle; 241—guiding portion; 242—elastic post; 243—third limiting portion; 300—holder; 310—fifth limiting portion; 400—fixed cover; 410—accommodating cavity; 420—sixth limiting portion; 500—rotary member.

DETAILED DESCRIPTION OF EMBODIMENTS

Embodiments of the present disclosure are described in detail below, and examples of the embodiments are shown in the drawings, in which like or similar signs represent like or similar elements or elements having like or similar functions throughout the drawings. The embodiments described below with reference to the drawings are exemplary, and merely used to explain the present disclosure, but cannot be construed as limitation to the present disclosure.

In the description of the present disclosure, it should be understood that orientation or positional relations indicated by terms "center", "longitudinal", "lateral", "length", "width", "thickness", "upper", "lower", "front", "back", "left", "right", "vertical", "horizontal", "top", "bottom", "inner", "outer", "clockwise", "anticlockwise", "axial", "radial", and "circumferential" and so on are based on orientation or positional relations as shown in the drawings, merely for facilitating the description of the present disclosure and simplifying the description, rather than indicating or implying that related devices or elements have to be in the specific orientation or configured and operated in a specific orientation, therefore, they should not be construed as limitation on the present disclosure.

In addition, the terms "first" and "second" are used for descriptive purposes only, and should not be understood as indicating or implying importance in the relativity or an implicitly indicating the number of the indicated technical features. Thus, a feature defined with the terms "first" and "second" may explicitly or implicitly include one or more such features. In the description of the present disclosure, "multiple (a plurality of)" refers to two or more than two, unless otherwise defined explicitly and specifically.

In the present disclosure, unless otherwise specified and defined explicitly, terms such as "mount", "join", "connect", and "fix" should be construed in a broad sense, for example, a connection may be a fixed connection, a detachable connection, or an integral connection; it may be a mechanical connection, or also may be an electrical connection; it may be a direct connection, an indirect connection via an intermediary, or internal communication between two elements or interaction between two elements. For those ordinarily skilled in the art, specific meanings of the above-mentioned terms in the present disclosure can be understood according to specific circumstances.

In the present disclosure, unless otherwise specified and defined explicitly, a first feature being "above" or "below" a second feature may include the first feature and the second feature being in direct contact, or the first feature and the second feature being in contact through an intermediary. Moreover, a first feature being "on", "over", and "above" a second feature may include a case where the first feature is directly above or not directly above the second feature, or merely indicates that the first feature is at a horizontal height higher than the second feature. The first feature being "under", "beneath", and "below" a second feature may include a case where the first feature is directly below or not directly below the second feature, or merely indicates that the first feature is at a horizontal height lower than the second feature.

Embodiment 1

Figure 1:
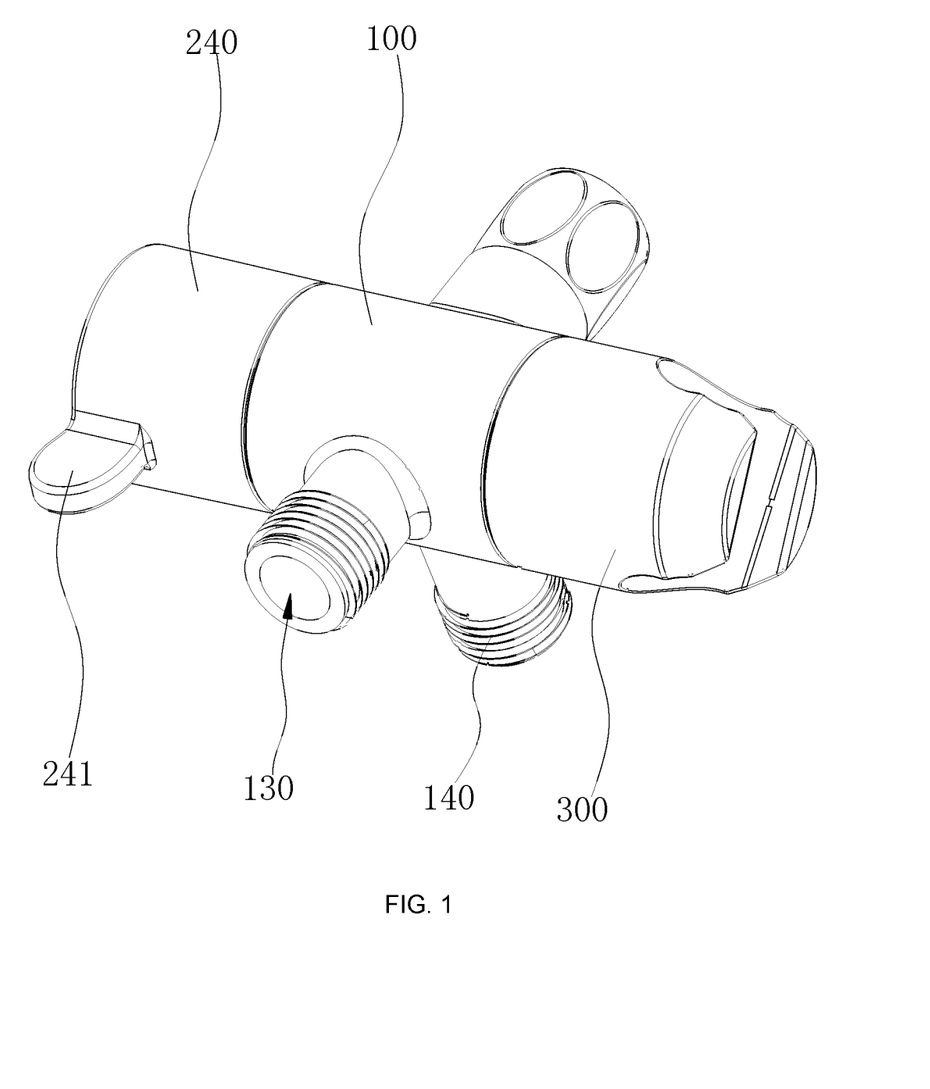
FIG. 1 shows a structural schematic diagram of a water path change-over valve provided in an embodiment of the present disclosure.
Figure 2:
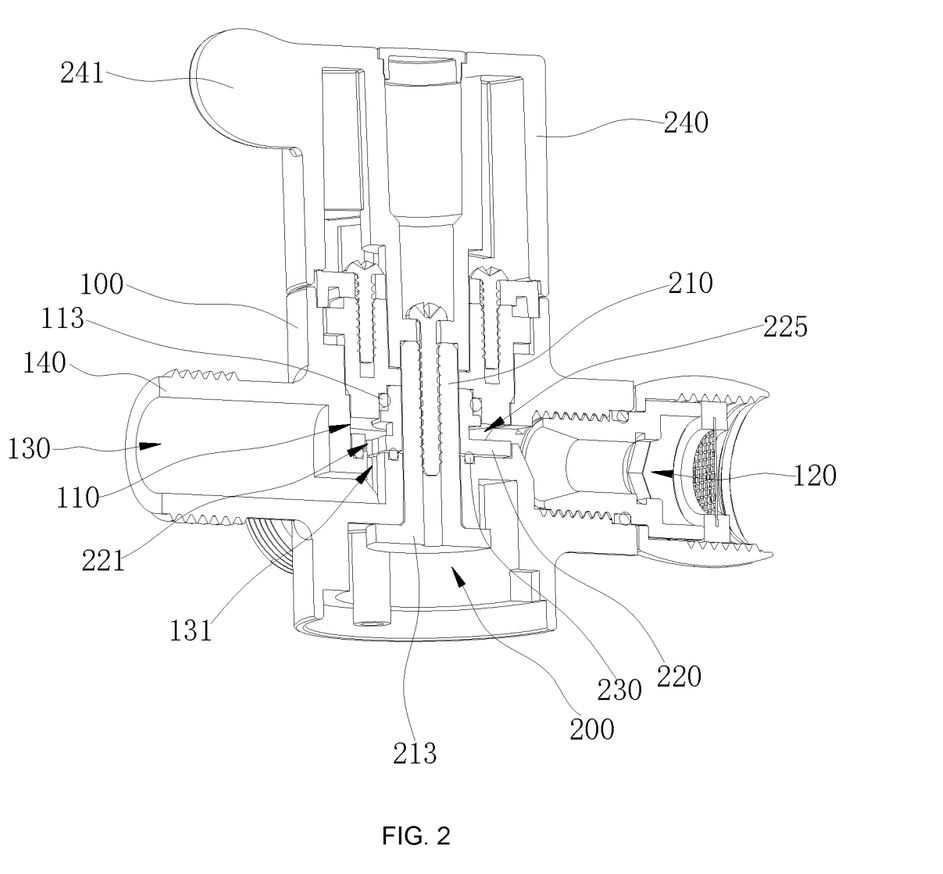
FIG. 2 shows a sectional structural schematic diagram of the water path change-over valve provided in an embodiment of the present disclosure.

Referring to FIG. 1 and FIG. 2, the present embodiment provides a water path change-over valve, applied to bathroom devices, wherein the water path change-over valve includes a valve seat assembly 100 and a water path change-over assembly 200. The valve seat assembly 100 has a water path change-over cavity 110, a water inlet channel 120, and a plurality of water outlet channels 130, the inlet channel 120 and the plurality of water outlet channels 130 are respectively in communication with the water path change-over cavity 110, and an inner wall of the water path change-over cavity 110 is respectively provided with a water inlet hole 121 in communication with the water inlet channel 120 and water outlet holes 131 in communication with the water outlet channels 130. The water path change-over assembly 200 is located in the water path change-over cavity 110, and includes a valve rod 210 and a rotating member 220, the valve rod 210 is connected with the rotating member 220 and two ends of the valve rod 210 respectively rotatably penetrate through the valve seat assembly 100, and the rotating member 220 is provided thereon with a water through hole 221. The valve rod 210 drives the rotating member 220 to rotate, so that the water through hole 221 can be corresponding to a position of at least one water outlet hole 131, so as to realize that the water inlet hole 121 is in communication with at least one water outlet hole 131 through the water through hole 221.

When the water path change-over valve provided in the embodiment of the present disclosure is in use, a user can control the valve rod 210 to rotate, so that the rotating member 220 in the water path change-over cavity 110 is driven by the valve rod 210 to rotate, further the water through hole 221 of the rotating member 220 is in communication with the water outlet holes 131 at different positions, respectively, and finally the water inlet channel 120 is in change-over communication with different water outlet channels 130, respectively, through the water through hole 221. As the valve rod 210 is connected with the rotating member 220 and two ends of the valve rod 210 respectively rotatably penetrate through the valve seat assembly 100, the rotating member 220 can be rotatably connected with the valve seat assembly 100 through the connection with the valve rod 210. The configuration mode that the two ends of the valve rod 210 are respectively rotatably connected with the valve seat assembly 100 can improve the situation of fracture of the valve rod 210 due to stress concentration under the pressure action of the rotating member 220 and water flow, and when the valve rod 210 is damaged, the water path change-over valve can be maintained by replacing the valve rod 210.

In the above, different water outlet channels 130 can be respectively in communication with different bathroom devices such as a hand-held shower head, a spray gun, a top shower, and a faucet.

Figure 3:
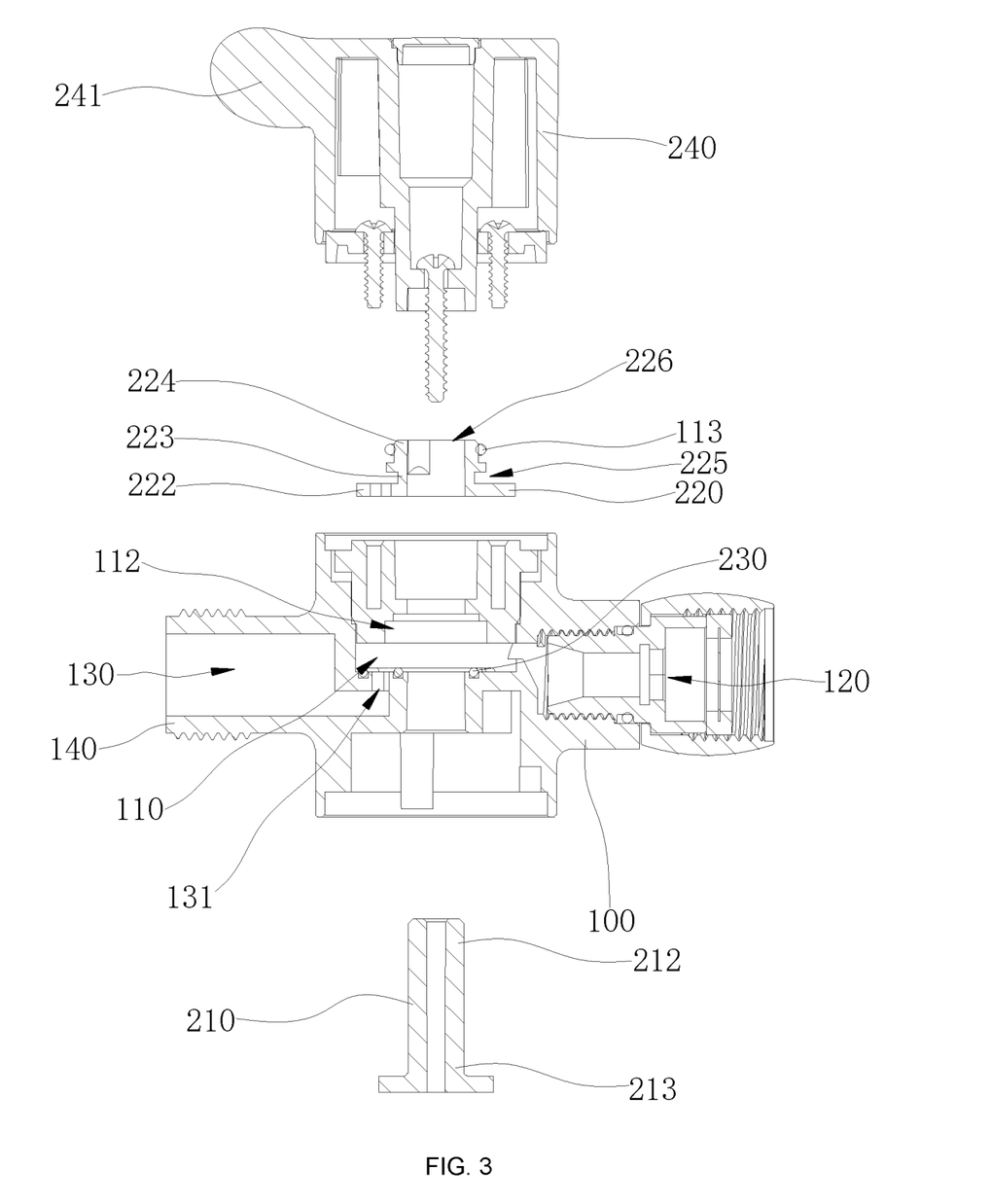
FIG. 3 shows an exploded sectional structural schematic diagram of the water path change-over valve provided in an embodiment of the present disclosure.

As shown in FIG. 2 and FIG. 3, in the above embodiment, optionally, the rotating member 220 includes a first disc portion 222, a connecting portion 223, and a second disc portion 224 which are sequentially connected along an axial direction of a central axis of rotation of the rotating member, wherein the valve rod 210 penetrates through the first disc portion 222, the connecting portion 223, and the second disc portion 224 in sequence, the first disc portion 222 is provided with the water through hole 221, two opposite surfaces of the first disc portion 222 and the second disc portion 224 are respectively abutted against two opposite inner wall surfaces of the water path change-over cavity 110, a water inlet gap 225 between the first disc portion 222 and the second disc portion 224 is corresponding to the position of the water inlet hole 121, so that a liquid entering the water path change-over cavity 110 from the water inlet hole 121 can flow into the water through hole 221 from the water inlet gap 225.

Specifically, when the water path change-over valve is in use, the water flow entering the water path change-over cavity 110 from the water inlet hole 121 can flow into the water through hole 221 through the water inlet gap 225 between the first disc portion 222 and the second disc portion 224, and in this process, the water flow flowing into the water inlet gap 225 can generate forces respectively on the first disc portion 222 and the second disc portion 224 which are in opposite directions and can counteract each other to some extent, thus reducing a friction force between the rotating member 220 and the inner wall surface in the water path change-over cavity 110 provided with the water outlet holes 131, further reducing the resistance when the valve rod 210 and the rotating member 220 rotate, so that it is convenient for the user to control the rotation of the valve rod 210. In the above, by adjusting a ratio of areas of cross sections of the first disc portion 222 and the second disc portion 224 perpendicular to the central axis of rotation thereof, a direction and magnitude of a force on the rotating member 220 applied by the water flow can be changed, for example, when the first disc portion 222 has an area greater than that of the second disc portion 224, the force of the water flow on the first disc portion 222 is greater than the force of the water flow on the second disc portion 224.

Figure 6:
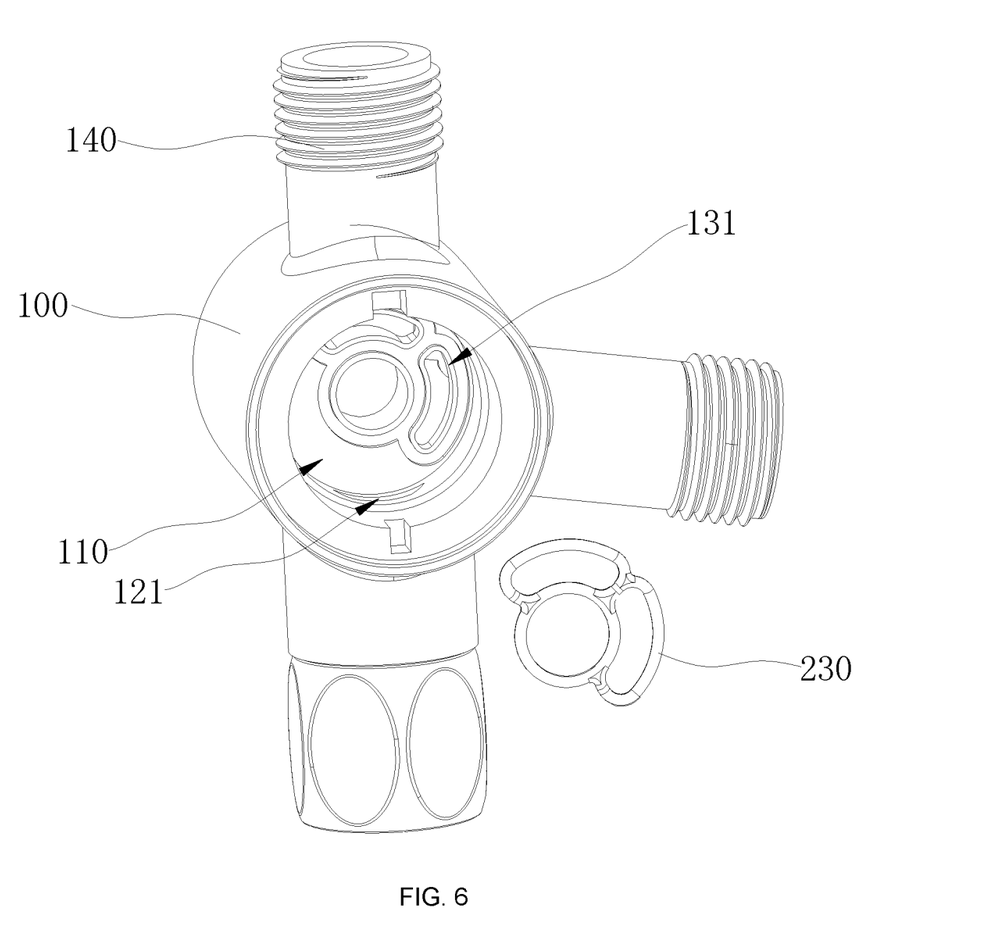
FIG. 6 shows a structural schematic diagram of a valve seat assembly of the water path change-over valve provided in an embodiment of the present disclosure.

As shown in FIG. 3 and FIG. 6, in the above embodiments, optionally, a plurality of annular sealing members 230 are further provided in the water path change-over cavity 110, an annular groove 111 is formed at an edge of each water outlet hole 131, and each annular sealing member 230 abuts between the first disc portion 222 and an inner wall surface of corresponding annular groove 111, respectively.

Specifically, by providing the annular groove 111 capable of fixing the annular sealing member 230 at the edge of each water outlet hole 131, and abutting each annular sealing member 230 between the first disc portion 222 and the inner wall surface of the corresponding annular groove 111, so as to limit the annular sealing member 230 through the annular groove 111, and the problem of position displacement of the annular sealing member 230 under the effect of the friction force of the rotating member 220 can be avoided. Moreover, the configuration of the annular sealing member 230 can solve the problem that the liquid flowing through the water through hole 221 and the water outlet hole 131 leaks from the gap between the rotating member 220 and the edge of the water outlet hole 131, and flows into the remaining water outlet holes 131.

As shown in FIG. 6, in the above embodiments, optionally, adjacent annular sealing members 230 are connected with each other and integrally molded, and adjacent annular grooves 111 are in communication with each other.

Specifically, a plurality of adjacent annular sealing members 230 are connected to each other and integrally molded, so that the plurality of annular sealing members 230 are connected to each other and form a special-shaped sealing member, thus the structural strength of the special-shaped sealing member is improved and the friction force between the special-shaped sealing member and edges of the water outlet holes 131 is increased, and the problem that the special-shaped sealing member is driven by the rotating member 220 can be solved to some extent.

As shown in FIG. 2 and FIG. 3, in the above embodiments, optionally, a mounting groove 112 is provided on a surface in the water path change-over cavity 110 close to the second disc portion 224, and the second disc portion 224 abuts against inside of the mounting groove 112.

Specifically, when the second disc portion 224 abuts against inside of the mounting groove 112, a smaller part of the second disc portion 224 is exposed outside the mounting groove 112, then resistance of the second disc portion 224 to the liquid when flowing into the water inlet gap 225 can be reduced.

Figure 4:
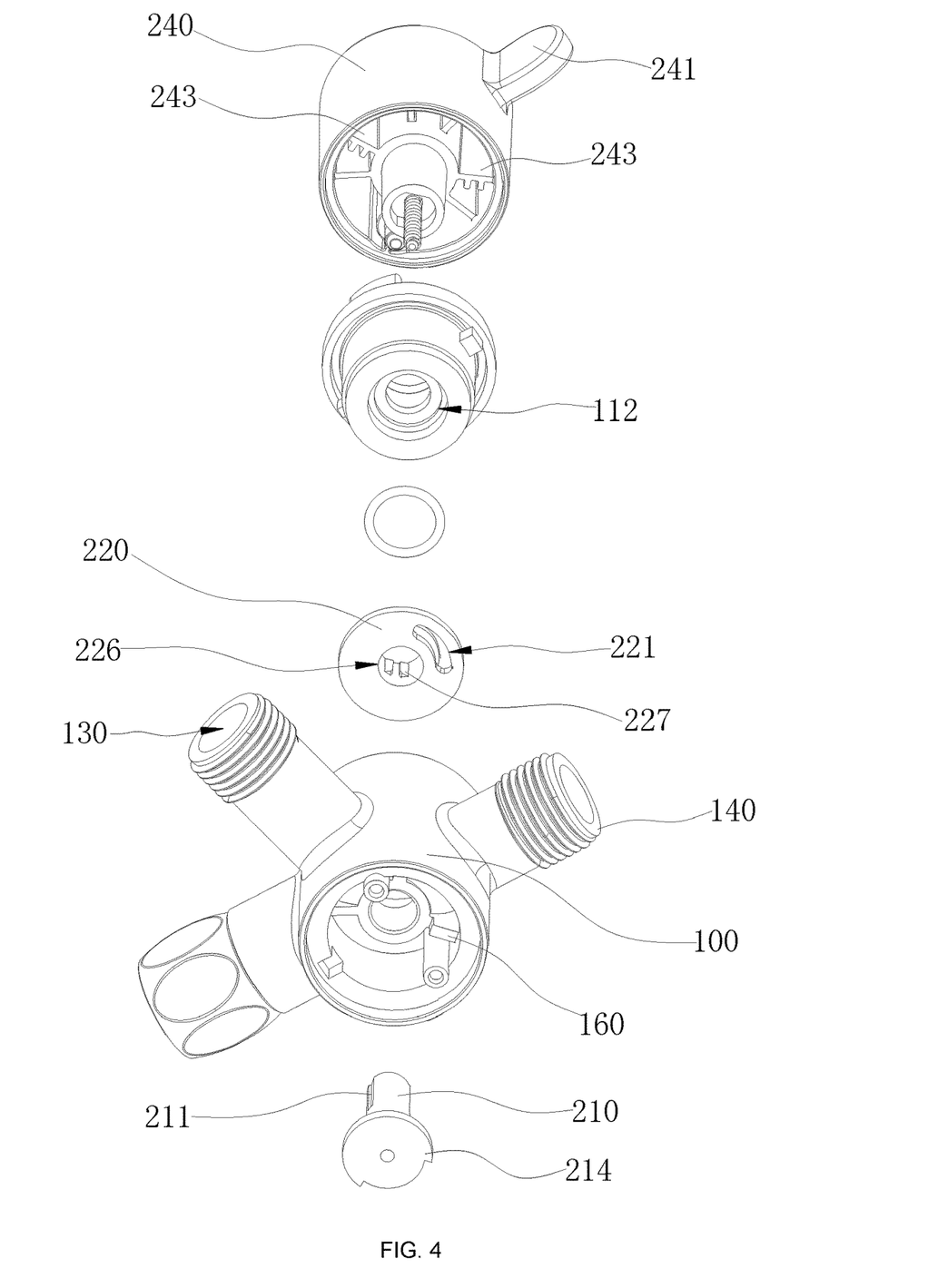
FIG. 4 shows an exploded structural schematic diagram of the water path change-over valve provided in an embodiment of the present disclosure from one perspective.

As shown in FIG. 3 and FIG. 4, in the above embodiments, optionally, an elastic ring 113 is provided between the second disc portion 224 and the mounting groove 112.

Specifically, by providing the elastic ring 113 between the second disc portion 224 and the mounting groove 112, sealing performance between the second disc portion 224 and an inner wall surface of the mounting groove 112 can be improved, thus preventing the liquid from flowing out of the valve seat assembly 100 from the water path change-over cavity 110 through the gap between the second disc portion 224 and the inner wall surface of the mounting groove 112.

Figure 5:
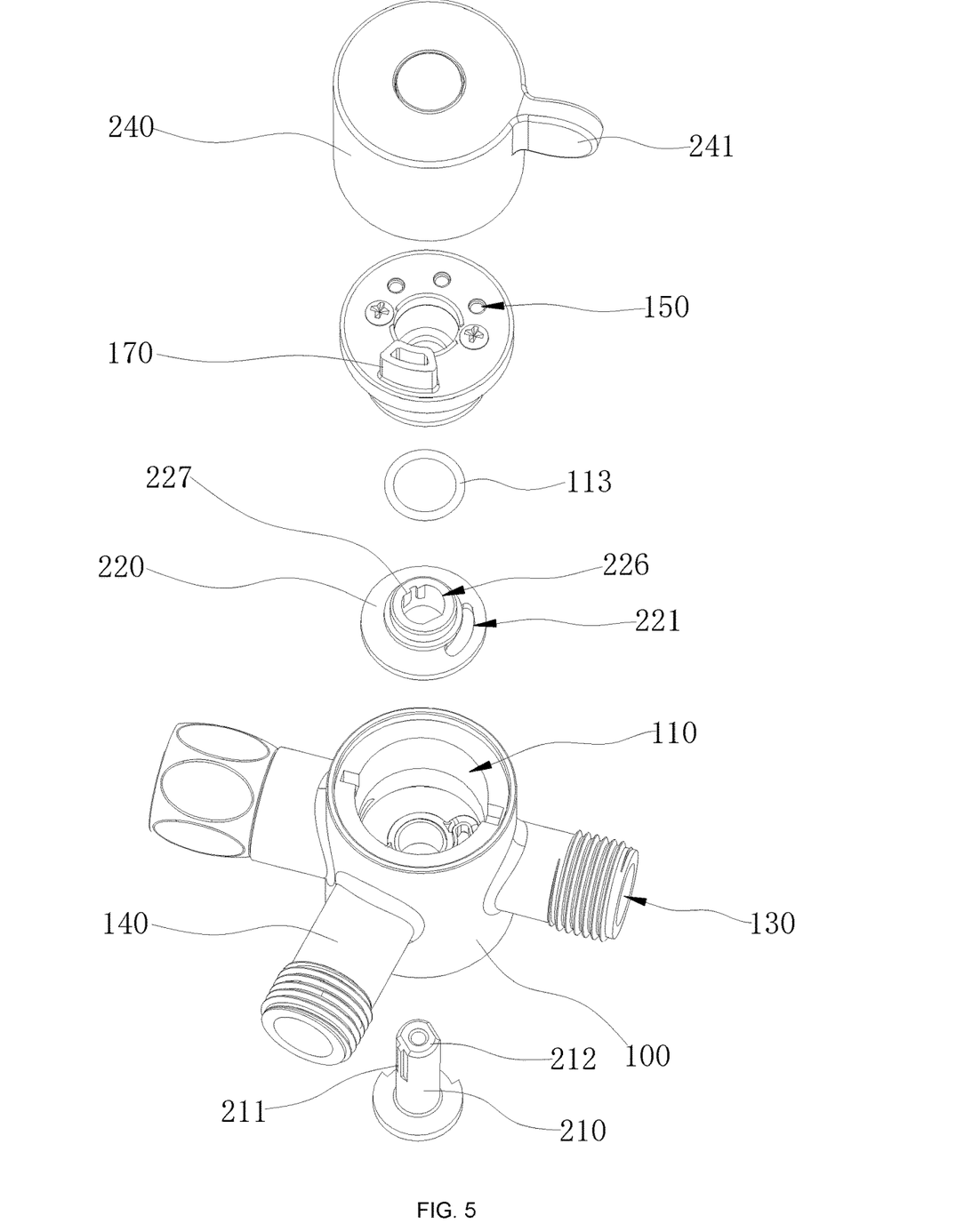
FIG. 5 shows an exploded structural schematic diagram of the water path change-over valve provided in an embodiment of the present disclosure from another perspective.

As shown in FIGS. 4 and 5, in the above embodiments, optionally, a penetrating hole 226 penetrates through the rotating member 220 along the axial direction of the central axis of rotation thereof, the valve rod 210 penetrates through the penetrating hole 226, an inner wall surface of the penetrating hole 226 is provided with a first positioning portion 227, and the valve rod 210 is circumferentially provided with a second positioning portion 211 corresponding to position of the first positioning portion 227, and the first positioning portion 227 abuts against the second positioning portion 211, so that the valve rod 210 can drive the rotating member 220 to rotate.

Specifically, by providing the first positioning portion 227 and the second positioning portion 211, which can cooperate with each other, respectively on the inner wall surfaces of the valve rod 210 and the penetrating hole 226, when the first positioning portion 227 and the second positioning portion 211 abut against each other, the rotating member 220 and the valve rod 210 can be limited, so that the valve rod 210 can drive the rotating member 220 to rotate. Moreover, the configuration of the first positioning portion 227 and the second positioning portion 211 can make the valve rod 210 penetrate through the rotating member 220 only at a certain rotation angle, which can achieve a fool-proof effect. In the above, the first positioning portion 227 and the second positioning portion 211 can be respectively configured as structures capable of achieving fool-proof limiting and positioning effects, such as positioning protrusions, positioning ribs, and positioning grooves, according to practical situations.

Embodiment 2

As shown in FIG. 4 and FIG. 5, on the basis of Embodiment 1, the present embodiment provides a configuration mode of a handle 240. In the above embodiments, optionally, the water path change-over assembly 200 further includes the handle 240, the handle 240 is connected to a first end 212 of the valve rod 210, and the handle 240 is provided thereon with a guiding portion 241. The valve seat assembly 100 is provided thereon with a plurality of connectors 140 at intervals along a rotating direction of the rotating member 220, and each connector 140 is provided therein with one water outlet channel 130. When the handle 240 drives the rotating member 220 to rotate through the valve rod 210, so that the guiding portion 241 is corresponding to a position of a certain connector 140, and the water through hole 221 is in communication with the water inlet channel 120 in the connector 140. When the guiding portion 241 is corresponding to a position between two adjacent connectors 140, the water through hole 221 is in communication with the water outlet channels 130 in the two connectors 140, respectively.

Specifically, by providing the guiding portion 241 on the handle 240, when the guiding portion 241 is corresponding to a position of a certain connector 140, the handle 240 drives the rotating member 220 to rotate through the valve rod 210 until the water through hole 221 is in communication with the corresponding water outlet hole 131, so that the water through hole 221 is in communication with the water inlet channel 120 in the corresponding connector 140. When the guiding portion 241 is corresponding to the position between two adjacent connectors 140, that is, the guiding portion 241 points to a position between two adjacent connectors 140, the handle 240 drives the rotating member 220 to rotate through the valve rod 210 until the water through hole 221 is in communication with two corresponding water outlet holes 131, so that the water through hole 221 is in communication with the water inlet channel 120 in the corresponding connector 140. Therefore, the configuration mode of the handle 240 and the guiding portion 241 can facilitate the user in switching different water outlet functions. In the above, the guiding portion 241 can be a holder or an arrow mark, and the holder can facilitate the user in controlling the rotation of the handle 240.

Figure 7:
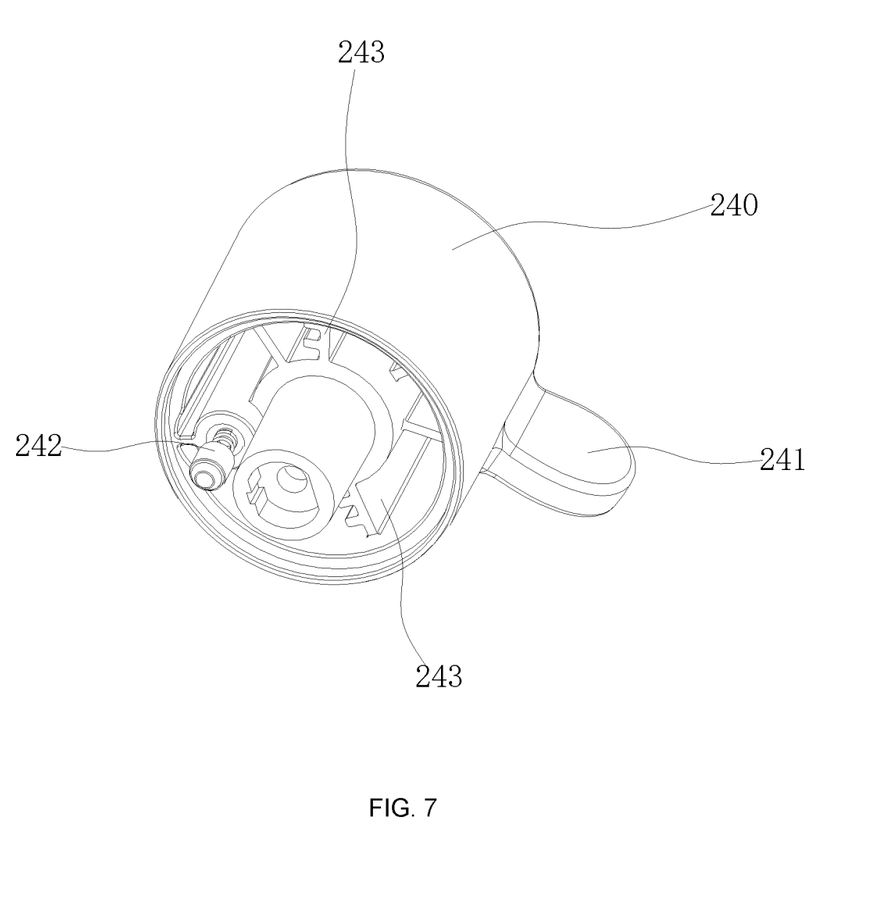
FIG. 7 shows a structural schematic diagram of a handle of the water path change-over valve provided in an embodiment of the present disclosure.

As shown in FIG. 5 and FIG. 7, in the above embodiments, optionally, an elastic post 242 is provided on a side of the handle 240 facing the valve seat assembly 100, an abutment end of the elastic post 242 elastically abuts against the valve seat assembly 100, and the handle 240 drives the elastic post 242 to rotate, so that the abutment end slides with respect to the valve seat assembly 100.

Specifically, the handle 240 is provided with the elastic post 242 on the side facing the valve seat assembly 100, the abutment end of the elastic post 242 can elastically abut against the valve seat assembly 100. With the elastic force of the elastic post 242, the problem of noises generated due to structure looseness between the handle 240 and the valve seat assembly 100 can be alleviated, and the hand feeling of the user's operation can be improved.

In the above, the elastic post 242 may include a spring and a post body, and the spring abuts between the post body and the handle 240.

As shown in FIG. 5 and FIG. 7, in the above embodiments, optionally, the valve seat assembly 100 is provided with a plurality of positioning grooves 150 at intervals on a side close to the handle 240 along the rotating direction of the rotating member 220. When the abutment end is sequentially clamped into the positioning grooves 150 at different positions, the guiding portion 241 is corresponding to a position of a certain connector 140 or is corresponding to a position between two adjacent connectors 140, respectively.

Specifically, by providing the plurality of positioning grooves 150 at intervals on the side of the valve seat assembly 100 close to the handle 240 along the rotating direction of the rotating member 220, when the handle 240 is rotated to the abutment end of the elastic post 242 to be respectively clamped into the positioning grooves 150 at different positions, the guiding portion 241 can be corresponding to a position of a certain connector 140 or a position between two adjacent connectors 140, thus, the water path change-over valve is made to switch different water outlet functions. Moreover, in the process of rotation of the handle 240, when the elastic post 242 slides relative to the valve seat assembly 100 to the abutment end abutting into the positioning groove 150, the abutment end and the inner wall surface of the positioning groove 150 will collide and generate a prompt sound, and the prompt sound can remind the user that the water out function has been switched to next gear.

Figure 8:
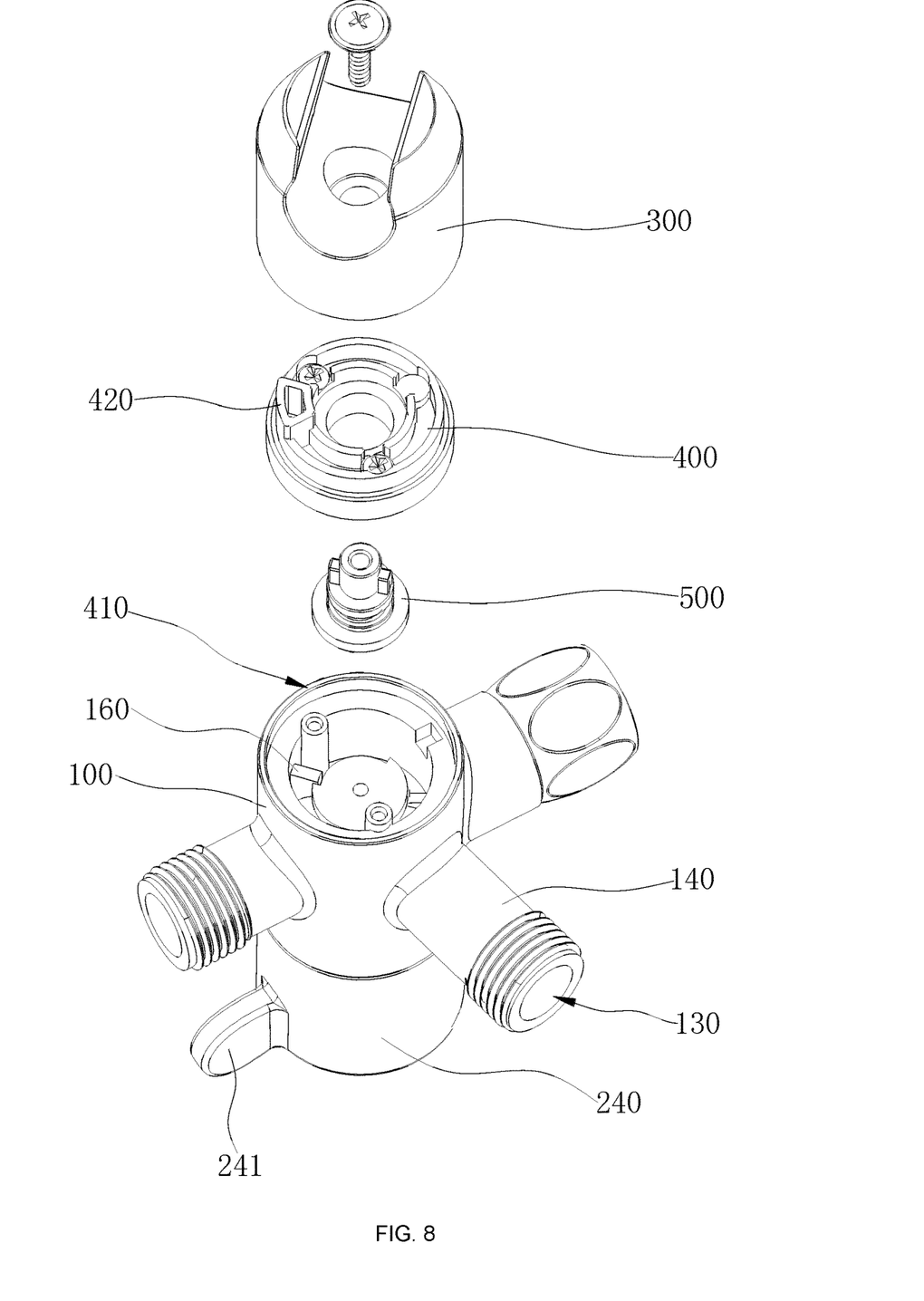
FIG. 8 shows an exploded structural schematic diagram of the water path change-over valve, provided with a holder, provided in an embodiment of the present disclosure.

As shown in FIG. 5 and FIG. 8, in the above embodiments, optionally, the second end 213 of the valve rod 210 is provided with a first limiting portion 214 along a rotating direction thereof, the valve seat assembly 100 is provided thereon with a second limiting portion 160 corresponding to a position of the first limiting portion 214, and two opposite surfaces of the first limiting portion 214 along a rotating direction thereof can respectively abut against the second limiting portion 160, so as to limit a maximum range of rotation angle of the valve rod 210; and/or the handle 240 is provided thereon with a third limiting portion 243, the valve seat assembly 100 is provided thereon with a fourth limiting portion 170 corresponding to a position of the third limiting portion 243, and two opposite surfaces of the third limiting portion 243 along a rotating direction thereof can respectively abut against the fourth limiting portion 170, so as to limit a maximum range of rotation angle of the handle 240.

Specifically, when the two opposite surfaces of the first limiting portion 214 of the valve rod 210 along its rotating direction respectively abut against the second limiting portion 160 of the valve seat assembly 100, a maximum range of rotation angle between the valve rod 210 and the valve seat assembly 100 can be limited, such that the valve rod 210 controls the maximum range of rotation angle of the handle 240 according to the number and positions of water outlet holes 131. When the two opposite surfaces of the third limiting portion 243 of the handle 240 along its rotating direction respectively abut against the fourth limiting portion 170 of the valve seat assembly 100, a maximum range of rotation angle between the handle 240 and the valve seat assembly 100 can be limited, such that the handle 240 controls the maximum range of rotation angle according to the number and positions of water outlet holes 131. In the above, the first limiting portion 214, the second limiting portion 160, the third limiting portion 243, and the fourth limiting portion 170 can be respectively provided as limiting structures such as arc-shaped grooves, limiting protrusions, and limiting ribs according to practical situations.

Embodiment 3

Figure 9:
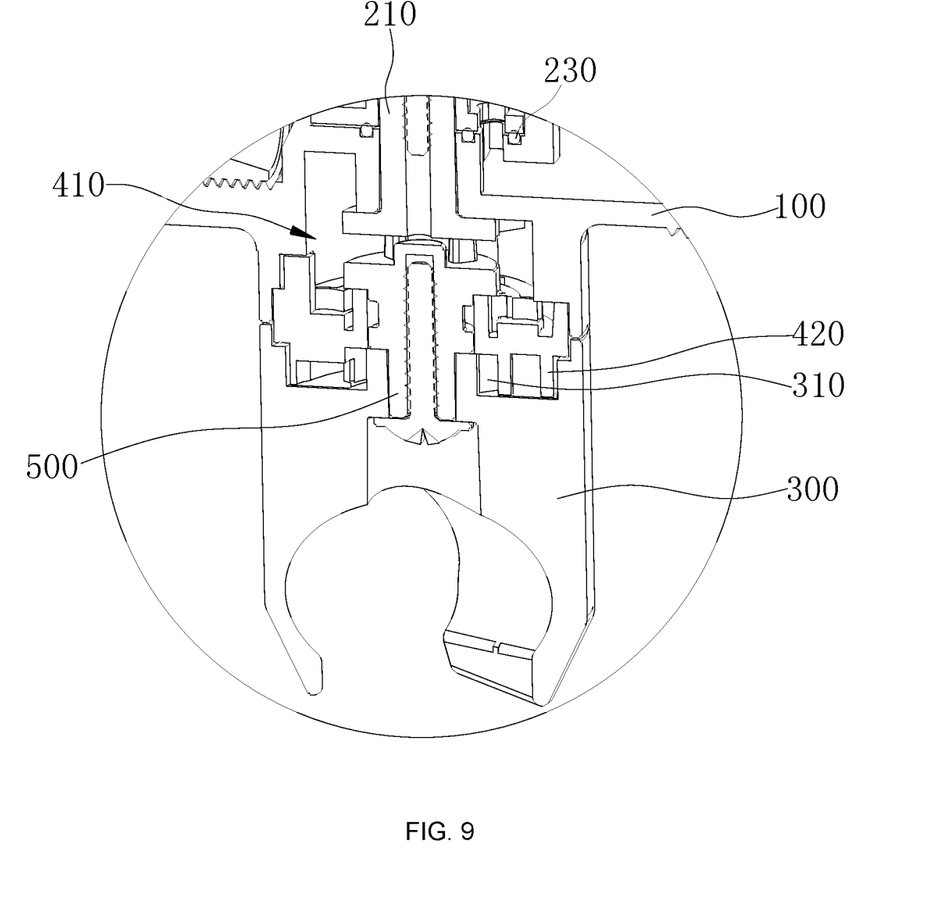
FIG. 9 shows a partial sectional structural schematic diagram of the water path change-over valve, provided with a holder, provided in an embodiment of the present disclosure.

As shown in FIG. 1, FIG. 8, and FIG. 9, on the basis of Embodiment 1 or Embodiment 2, the present embodiment provides a configuration mode of a holder 300. In the above embodiments, optionally, the water path change-over valve further includes the holder 300, and the holder 300 is rotatably connected to a side of the valve seat assembly 100 away from the handle 240.

Specifically, by rotatably connecting the holder 300, which can be used to fix sanitary fittings such as a hand-held shower head and a spray gun, to one side of the valve seat assembly 100 away from the handle 240, the water path change-over valve can be used as a fixed bracket, and the user can adjust a water outlet angle of the hand-held shower head and the spray gun by adjusting a rotation angle of the holder 300.

As shown in FIG. 8 and FIG. 9, in the above embodiments, optionally, the water path change-over valve further includes a fixed cover 400 and a rotary member 500, the valve seat assembly 100 and the fixed cover 400 enclose to form an accommodating cavity 410, the rotary member 500 is located in the accommodating cavity 410, and one end of the rotary member 500 rotatably penetrates through the fixed cover 400 and is connected to the holder 300, so that the fixed cover 400 abuts between the rotary member 500 and the holder 300.

Specifically, as the fixed cover 400 and the valve seat assembly 100 are connected and enclose to form the accommodating cavity 410, and one end of the rotary member 500 located in the accommodating cavity 410 rotatably penetrates through the fixed cover 400 and is connected to the holder 300, the fixed cover 400 can abut against the rotary member 500 and the holder 300 respectively, thus a friction force between the fixed cover 400 and the rotary member 500 and a friction force between the fixed cover 400 and the holder 300 can be improved, respectively, thus increasing the resistance when the holder 300 rotates.

As shown in FIG. 8 and FIG. 9, in the above embodiments, optionally, the holder 300 is provided thereon with a fifth limiting portion 310, the fixed cover 400 is provided thereon with a sixth limiting portion 420 corresponding to a position of the fifth limiting portion 310, and two opposite surfaces of the fifth limiting portion 310 along a rotating direction thereof can respectively abut against the sixth limiting portion 420, so as to limit a maximum range of rotation angle of the holder 300.

Specifically, the two opposite surfaces of the fifth limiting portion 310 on the holder 300 along the rotating direction thereof can respectively abut against the sixth limiting portion 420 on the fixed cover 400, thereby limiting the maximum range of rotation angle of the holder 300. In the above, the fifth limiting portion 310 and the sixth limiting portion 420 can be provided as limiting structures such as limiting protrusions, limiting grooves, and limiting ribs according to practical situations.

Embodiment 4

Another embodiment of the present disclosure provides a bathroom device, including the water path change-over valve in any one of the above embodiments.

The bathroom device provided in the embodiments of the present disclosure, as having the water path change-over valve provided in any embodiment in the above, has all the beneficial effects of the water path change-over valve provided in any embodiment in the above, which are not repeated herein one by one.

In the above embodiments, optionally, the bathroom device may include the water path change-over valve and sanitary fittings such as a water inlet pipe, a hand-held shower, a spray gun, a top shower, and faucet.

In the description of the present description, descriptions with reference to terms such as "one embodiment", "some embodiments", "example", "specific example" or "some examples" indicate that specific features, structures, materials or characteristics described in combination with this embodiment or example are included in at least one embodiment or example of the present disclosure. In the present description, exemplary expressions of the above terms do not necessarily refer to the same embodiment or example. Moreover, the specific features, structures, materials or characteristics described can be combined in any appropriate manner in any one or more embodiments or examples. Besides, a person skilled in the art could incorporate and combine different embodiments or examples described in the present description and features of different embodiments or examples, without conflict.

Although the embodiments of the present disclosure have been shown and described above, it could be understood that the above embodiments are exemplary, and should not be construed as limitation to the present disclosure, and those ordinarily skilled in the art could change, modify, substitute and vary the above embodiments within the scope of the present disclosure.

What is claimed is:

1. A water path change-over valve, comprising:
a valve seat assembly, having a water path change-over cavity, a water inlet channel, and a plurality of water outlet channels, wherein the inlet channel and the plurality of water outlet channels are respectively in communication with the water path change-over cavity, and an inner wall of the water path change-over cavity is respectively provided with a water inlet hole in communication with the water inlet channel and water outlet holes in communication with the water outlet channels; and
a water path change-over assembly, located in the water path change-over cavity, and comprising a valve rod and a rotating member, wherein the valve rod is connected with the rotating member and two ends of the valve rod respectively rotatably penetrate through the valve seat assembly, and the rotating member is provided thereon with a water through hole, wherein
the valve rod drives the rotating member to rotate, so that the water through hole can be corresponding to a position of at least one of the water outlet holes, so as to realize that the water inlet hole is in communication with at least one of the water outlet holes through the water through hole,
wherein the rotating member comprises a first disc portion, a connecting portion, and a second disc portion, which are sequentially connected along an axial direction of a central axis of rotation of the rotating member, wherein the valve rod penetrates through the first disc portion, the connecting portion, and the second disc portion in sequence, the first disc portion is provided with the water through hole, two opposite surfaces of the first disc portion and the second disc portion are respectively abutted against two opposite inner wall surfaces of the water path change-over cavity, and a water inlet gap between the first disc portion and the second disc portion is corresponding to a position of the water inlet hole, so that a liquid entering the water path change-over cavity from the water inlet hole can flow into the water through hole from the water inlet gap.

2. The water path change-over valve according to claim 1, wherein a plurality of annular sealing members are further provided in the water path change-over cavity, an annular groove is formed at an edge of each water outlet hole, and each of the annular sealing members abuts between the first disc portion and an inner wall surface of a corresponding annular groove, respectively.

3. The water path change-over valve according to claim 2, wherein adjacent annular sealing members are connected with each other and integrally molded, and adjacent annular grooves are in communication with each other.

4. The water path change-over valve according to claim 1, wherein a mounting groove is provided on a surface in the water path change-over cavity close to the second disc portion, and the second disc portion abuts against an inside of the mounting groove.

5. The water path change-over valve according to claim 4, wherein an elastic ring is provided between the second disc portion and the mounting groove.

6. The water path change-over valve according to claim 1, wherein a penetrating hole penetrates through the rotating member along an axial direction of a central axis of rotation of the rotating member, the valve rod penetrates through the penetrating hole, an inner wall surface of the penetrating hole is provided with a first positioning portion, and the valve rod is circumferentially provided with a second positioning portion corresponding to a position of the first positioning portion, and the first positioning portion abuts against the second positioning portion, so that the valve rod can drive the rotating member to rotate.

7. The water path change-over valve according to claim 1, wherein the water path change-over assembly further comprises a handle, the handle is connected to a first end of the valve rod, and the handle is provided thereon with a guiding portion;
    the valve seat assembly is provided thereon with a plurality of connectors at intervals along a rotating direction of the rotating member, and each of the connectors is provided therein with one of the water outlet channels;
    when the handle drives the rotating member to rotate through the valve rod so that the guiding portion is corresponding to a position of a certain one of the connectors, the water through hole is in communication with the water inlet channel in the connector; and
    when the guiding portion is corresponding to a position between two adjacent connectors, the water through hole is in communication with the water outlet channels in the two connectors, respectively.

8. The water path change-over valve according to claim 7, wherein an elastic post is provided on a side of the handle facing the valve seat assembly, an abutment end of the elastic post elastically abuts against the valve seat assembly, and the handle drives the elastic post to rotate, so that the abutment end slides with respect to the valve seat assembly.

9. The water path change-over valve according to claim 8, wherein the valve seat assembly is provided with a plurality of positioning grooves at intervals on a side close to the handle along the rotating direction of the rotating member, wherein when the abutment end is sequentially clamped into the positioning grooves at different positions, the guiding portion is corresponding to a position of a certain one of the connectors or is corresponding to a position between two adjacent connectors, respectively.

10. The water path change-over valve according to claim 9, wherein a second end of the valve rod is provided with a first limiting portion along a rotating direction of the valve rod, the valve seat assembly is provided thereon with a second limiting portion corresponding to a position of the first limiting portion, and two opposite surfaces of the first limiting portion along a rotating direction of the first limiting portion can respectively abut against the second limiting portion, so as to limit a maximum range of rotation angle of the valve rod; and/or
    the handle is provided thereon with a third limiting portion, the valve seat assembly is provided thereon with a fourth limiting portion corresponding to a position of the third limiting portion, and two opposite surfaces of the third limiting portion along a rotating direction of the third limiting portion can respectively abut against the fourth limiting portion, so as to limit a maximum range of rotation angle of the handle.

11. The water path change-over valve according to claim 8, wherein a second end of the valve rod is provided with a first limiting portion along a rotating direction of the valve rod, the valve seat assembly is provided thereon with a second limiting portion corresponding to a position of the first limiting portion, and two opposite surfaces of the first limiting portion along a rotating direction of the first limiting portion can respectively abut against the second limiting portion, so as to limit a maximum range of rotation angle of the valve rod; and/or
    the handle is provided thereon with a third limiting portion, the valve seat assembly is provided thereon with a fourth limiting portion corresponding to a position of the third limiting portion, and two opposite surfaces of the third limiting portion along a rotating direction of the third limiting portion can respectively abut against the fourth limiting portion, so as to limit a maximum range of rotation angle of the handle.

12. The water path change-over valve according to claim 7, wherein a second end of the valve rod is provided with a first limiting portion along a rotating direction of the valve rod, the valve seat assembly is provided thereon with a second limiting portion corresponding to a position of the first limiting portion, and two opposite surfaces of the first limiting portion along a rotating direction of the first limiting portion can respectively abut against the second limiting portion, so as to limit a maximum range of rotation angle of the valve rod; and/or
    the handle is provided thereon with a third limiting portion, the valve seat assembly is provided thereon with a fourth limiting portion corresponding to a position of the third limiting portion, and two opposite surfaces of the third limiting portion along a rotating direction of the third limiting portion can respectively abut against the fourth limiting portion, so as to limit a maximum range of rotation angle of the handle.

13. The water path change-over valve according to claim 7, wherein the water path change-over valve further comprises a holder, and the holder is rotatably connected to a side of the valve seat assembly away from the handle.

14. The water path change-over valve according to claim 13, wherein the water path change-over valve further comprises a fixed cover and a rotary member, the valve seat assembly and the fixed cover enclose to form an accommodating cavity, the rotary member is located in the accommodating cavity, and one end of the rotary member rotatably penetrates through the fixed cover and is connected to the holder, so that the fixed cover abuts between the rotary member and the holder.

15. The water path change-over valve according to claim 14, wherein the holder is provided thereon with a fifth limiting portion, the fixed cover is provided thereon with a sixth limiting portion corresponding to a position of the fifth limiting portion, and two opposite surfaces of the fifth limiting portion along a rotating direction of the fifth limiting portion can respectively abut against the sixth limiting portion, so as to limit a maximum range of rotation angle of the holder.

16. A bathroom device, comprising the water path change-over valve according to claim 1.

* * * * *